(12) United States Patent
McGrath et al.

(10) Patent No.: US 10,255,110 B2
(45) Date of Patent: *Apr. 9, 2019

(54) NODE SELECTION FOR A NEW APPLICATION IN A MULTI-TENANT CLOUD HOSTING ENVIRONMENT

(71) Applicant: Red Hat, Inc., Raleigh, NC (US)

(72) Inventors: Michael P. McGrath, Schaumburg, IL (US); Matthew Hicks, Westford, MA (US); Daniel Charles McPherson, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/838,320

(22) Filed: Dec. 11, 2017

(65) Prior Publication Data
US 2018/0101408 A1 Apr. 12, 2018

Related U.S. Application Data

(63) Continuation of application No. 13/461,699, filed on May 1, 2012, now Pat. No. 9,842,002.

(51) Int. Cl.
*G06F 9/50* (2006.01)
*G06F 21/53* (2013.01)

(52) U.S. Cl.
CPC ............ *G06F 9/505* (2013.01); *G06F 9/5061* (2013.01); *G06F 9/5072* (2013.01); *G06F 21/53* (2013.01)

(58) Field of Classification Search
None
See application file for complete search history.

(56) References Cited

U.S. PATENT DOCUMENTS 6,009,452 A 12/1999 Horvitz
6,223,202 B1 4/2001 Bayeh
(Continued)

OTHER PUBLICATIONS

The Authoritative Dictionary of IEEE Standards Terms. 2000, Standards Information Network IEEE Press. seventh edition. p. 131 and 530.

(Continued)

*Primary Examiner* — Mohamed A Wasel
*Assistant Examiner* — Tsung Y Wu
(74) *Attorney, Agent, or Firm* — Lowenstein Sandler LLP

(57) ABSTRACT

A method includes instantiating a first web application for a first application owner on a virtual machine and instantiating a second web application for a second application owner. The second application owner is different than the first application owner. Instantiating the second web application includes determining that the second web application is associated with an attribute. The first web application is also associated with the attribute, and the attribute comprises an implementation related property of the first web application and the second web application. Instantiating the second web application also includes identifying the virtual machine as configured to host web applications having the attribute, responsive to identifying the virtual machine, instantiating the second web application on the virtual machine hosting the first web application. The second web application is prevented from accessing the first web application and the first web application is prevented from accessing the second web application.

20 Claims, 11 Drawing Sheets

(56) References Cited

U.S. PATENT DOCUMENTS

| | | |
|---|---|---|
| 7,634,542 B1 | 12/2009 | Krause et al. |
| 7,774,761 B2 | 8/2010 | Vohra |
| 7,853,708 B2 | 12/2010 | Townsley et al. |
| 8,352,941 B1 | 1/2013 | Protopopov et al. |
| 8,505,006 B1 | 8/2013 | Larkin et al. |
| 8,635,351 B2 | 1/2014 | Astete et al. |
| 9,317,325 B2 | 4/2016 | McGrath et al. |
| 2002/0075844 A1 | 6/2002 | Hagen |
| 2002/0078071 A1 | 6/2002 | Foster |
| 2002/0087958 A1 | 7/2002 | Krause |
| 2002/0091753 A1 | 7/2002 | Reddy et al. |
| 2003/0028805 A1 | 2/2003 | Lahteenmaki |
| 2004/0143826 A1* | 7/2004 | Gissel ............... G06F 9/445 717/162 |
| 2005/0022157 A1* | 1/2005 | Brendle ............... G06F 9/485 717/104 |
| 2007/0073858 A1* | 3/2007 | Lakshmi Narayanan ............... H04L 63/1408 709/223 |
| 2007/0128899 A1 | 6/2007 | Mayer |
| 2008/0034370 A1 | 2/2008 | Huizenga |
| 2008/0040769 A1 | 2/2008 | Cha |
| 2008/0163004 A1 | 7/2008 | Yu |
| 2008/0183690 A1 | 7/2008 | Ramachandran |
| 2008/0320474 A1 | 12/2008 | Jelinek et al. |
| 2009/0198766 A1 | 8/2009 | Chen et al. |
| 2009/0198769 A1 | 8/2009 | Keller et al. |
| 2009/0234941 A1 | 9/2009 | Ammerlaan et al. |
| 2009/0313374 A1 | 12/2009 | Murphy et al. |
| 2010/0153951 A1 | 6/2010 | Jones |
| 2010/0211950 A1 | 8/2010 | Kusko et al. |
| 2010/0274890 A1 | 10/2010 | Patel et al. |
| 2010/0275241 A1 | 10/2010 | Srinivasan |
| 2010/0281482 A1 | 11/2010 | Pike et al. |
| 2011/0055310 A1 | 3/2011 | Shavlik et al. |
| 2011/0185292 A1 | 7/2011 | Chawla |
| 2011/0246617 A1 | 10/2011 | Sheehan et al. |
| 2011/0252320 A1 | 10/2011 | Arrasvuori et al. |
| 2011/0265164 A1 | 10/2011 | Lucovsky et al. |
| 2011/0276584 A1 | 11/2011 | Cotner et al. |
| 2011/0277027 A1 | 11/2011 | Hayton et al. |
| 2011/0302415 A1 | 12/2011 | Ahmad et al. |
| 2012/0011077 A1 | 1/2012 | Bhagat |
| 2012/0096165 A1 | 4/2012 | Madduri et al. |
| 2012/0173581 A1 | 7/2012 | Hartig et al. |
| 2012/0215919 A1 | 8/2012 | Labat et al. |
| 2013/0007239 A1 | 1/2013 | Agarwal et al. |
| 2013/0031158 A1* | 1/2013 | Salsburg ............... G06F 9/5072 709/203 |
| 2013/0227560 A1 | 8/2013 | McGrath et al. |
| 2013/0227561 A1 | 8/2013 | Walsh et al. |
| 2013/0227563 A1 | 8/2013 | McGrath |
| 2013/0227635 A1 | 8/2013 | Walsh et al. |
| 2013/0297668 A1 | 11/2013 | McGrath et al. |
| 2013/0297672 A1 | 11/2013 | McGrath et al. |
| 2013/0297673 A1 | 11/2013 | McGrath et al. |
| 2013/0297685 A1 | 11/2013 | McGrath et al. |
| 2013/0297795 A1 | 11/2013 | McGrath et al. |
| 2013/0298183 A1 | 11/2013 | McGrath et al. |

OTHER PUBLICATIONS

Corcoran et al. Cross-Tier, Label-based Secuirty Enforcement for Web Applications. 2009. ACM. pp. 269-281.

Linux man page pam_namespace; htt://web.archive.org/web/20081014010639/http://linux.die.net/man/8/pam_nampespace; Oct. 14, 2008.

Loscocco et al. Meeting Critical Security Objectives with Security-Enhanced Linux. 2001. NSA. pp. 1-11.

Morris, James. File System Labeling in SELinux. 2004. RedHat. pp. 1-8.

Red Hat Inc., Red Hat Enterpise Linux 5 Deployment guide, "Deployment, configuration and administration of Red Hat Enterprise Linux 5", Chapter 46—Security and SELinux, pp. 823-848, 26 pages, Jul. 21, 2011.

Smalley, Stephen D. SELinux. 2001.NSA. pp. 1-23.

Unix man unshare clone Janak Desai, Jan. 11, 2006; p. 1-5.

Wiki LXC; http://web.archive.org/web/20120130164103/http://en.wikipedia.org/wiki/LXC; Jan. 30, 2012.

No Author, Google search for paas node capacity, World Wide Web, Jul. 14, 2014, 2 pages, http://www.google.com/?tbm=pts.

USPTO, Office Action for U.S. Appl. No. 13/461,712 dated Sep. 18, 2015.

USPTO, Office Action for U.S. Appl. No. 13/461,712 dated Apr. 5, 2016.

USPTO, Notice of Allowance for U.S. Appl. No. 13/461,722 dated Jul. 24, 2015.

USPTO, Notice of Allowance for U.S. Appl. No. 13/461,722 dated Dec. 16, 2015.

\* cited by examiner

NODE SELECTION FOR A NEW APPLICATION IN A MULTI-TENANT CLOUD HOSTING ENVIRONMENT

CROSS-REFERENCE TO RELATED APPLICATION

This Continuation Application claims priority to U.S. patent application Ser. No. 13/461,699, filed on May 1, 2012, which is incorporated by reference herein in its entirety.

TECHNICAL FIELD

The embodiments of the invention relate generally to cloud-based application hosting and, more specifically, relate to node selection for a cloud-based application.

BACKGROUND

Cloud computing is a computing paradigm in which a customer pays a "cloud provider" to execute a program on computer hardware owned and/or controlled by the cloud provider. It is common for cloud providers to make virtual machines hosted on its computer hardware available to customers for this purpose. The cloud provider typically provides an interface that a customer can use to requisition virtual machines and associated resources such as processors, storage, and network services, etc., as well as an interface a customer can use to install and execute the customer's program on the virtual machines that the customer requisitions, together with additional software on which the customer's program depends. For programs that are web applications, the additional software can include such software components as middleware and a framework. Web applications are programs that receive and act on requests in web or other Internet protocols, such as HTTP. It is common for a user to interact with a web application via a browser executing on the user's client computer system to send requests in a web protocol via the Internet to a server computer system on which the web application is executing. It is also common for automatic user agents to interact with web applications in web protocols in the same fashion.

While many web applications are suitable for execution in the cloud, it often requires significant expertise and effort in order to install, execute, and manage a web application in the cloud. For example, an administrator typically should identify all of the software components for the execution of a web application, and what versions of those software components are acceptable. In addition, the administrator typically should obtain, install, and appropriately configure each such software component, as well as the application itself. Where this high level of expertise and effort has been invested in order to get a web application running on a particular hypervisor and in a particular provider's cloud, a similarly high level of expertise and effort usually should be subsequently invested in order to execute the web application instead or in addition on a different hypervisor and/or in a different particular provider's cloud. Also, it can be difficult or impossible to obtain useful information about how the application is performing and otherwise behaving when executing in the cloud.

Accordingly, software and/or hardware facilities for facilitating the execution of web applications in the cloud have been introduced, and are known as Platform-as-a-Service (PaaS) offerings and systems. PaaS offerings facilitate deployment of applications without the cost and complexity of buying and managing the underlying hardware and software and provisioning hosting capabilities, providing all of the facilities for supporting the complete life cycle of building and delivering web application and services entirely available from the Internet. Typically, these facilities operate as one or more virtual machines (VMs) running on top of a hypervisor in a host server.

In present PaaS offerings, a first customer's deployed applications do not co-exist with any other customer's deployed applications on the VMs that are hosting the first customer's deployed applications. However, such an arrangement can be inefficient to the PaaS provider offering the platform services. This is because a customer often deploys a single application, and the size of the VM does not correspond to the size of the application. It can be costly to initialize a new VM for each customer's application deployment, and it can also be a waste of resources that are not being utilized. In a public cloud environment, a PaaS provider pays for deploying a VM whether the VM lies idle or not. In a private cloud environment, there is still a strain on resources for running VMs that are not completely utilized. As such, it may be more cost-efficient to deploy applications of multiple customers in a single VM, rather than associating a VM or a group of VMs with a single application or a group of applications from a single customer. However, a variety of implementation concerns arise when considering deploying applications of multiple customers in a single VM, such as security concerns and efficient resource sharing concerns.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Figure 1:
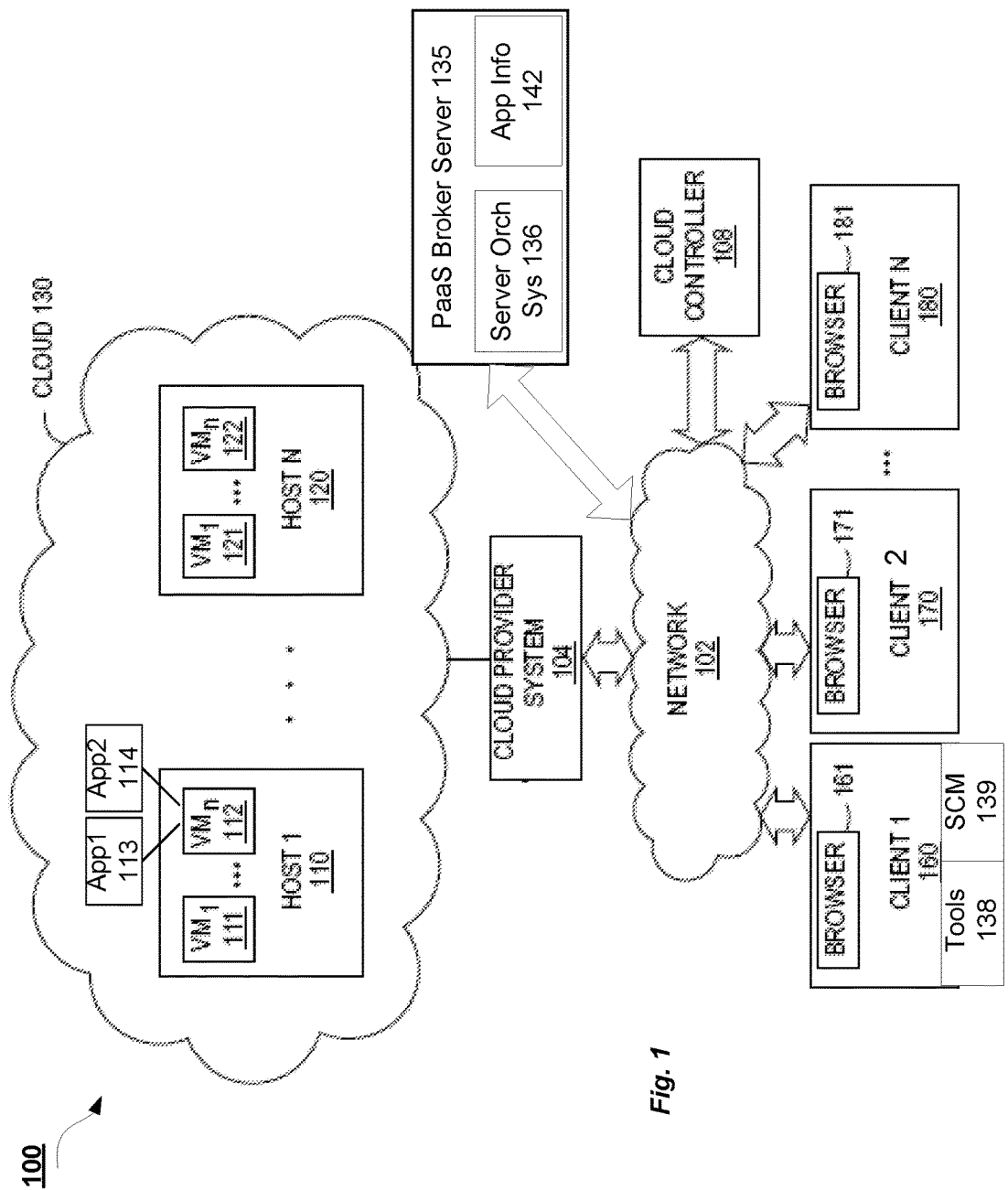
FIG. 1 is a block diagram of a network architecture in which embodiments of the invention may operate.

Embodiments of the invention provide for node selection for a new application in a multi-tenant cloud hosting environment. A method of the invention includes receiving a request to host a software application on one of a plurality of nodes of a cloud computing infrastructure, each node configured to host multiple software applications of different customers. A set of available nodes from the plurality of nodes can be identified on which the software application can be hosted and the capacity of each identified node to host additional software applications can be determined. Then, a node is selected to host the software application using the determined capacities.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", "executing," "applying," "discovering," identifying," "configuring," "establishing," "determining," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

Embodiments of the invention provide a method of selecting a node on which to launch a new application in a multi-tenant cloud-based PaaS environment. In one embodiment, the capacity of each available node is calculated and the node with the most capacity is selected to host the new application. In one embodiment, capacity is based on the number of software repositories on a node. In other embodiments, the capacity can be based on the number of active applications, or some weighted sum of the number or repositories and/or applications.

FIG. 1 is a block diagram of a network architecture 100 in which embodiments of the invention may operate. The network architecture 100 includes a cloud 130 managed by a cloud provider system 104. The cloud 130 provides virtual machines, such as virtual machines 111, 112, 121, and 122. Each virtual machine is hosted on a physical machine configured as part of the cloud 130. Such physical machines are often located in a data center. For example, virtual machines 111 and 112 are hosted on physical machine 110 in cloud 130 provided by cloud provider 104. Users can interact with applications executing on cloud-based virtual machines using client computer systems, such as clients 160, 170 and 180, via corresponding web browser programs 161, 171 and 181.

Clients 160, 170 and 190 are connected to hosts 110, 120 and the cloud provider system 104 via a network 102, which may be may be a private network (e.g., a local area network (LAN), a wide area network (WAN), intranet, or other similar private networks) or a public network (e.g., the Internet). Each client 160, 170, 190 may be a mobile device, a PDA, a laptop, a desktop computer, or any other computing device. Each host 110, 120 may be a server computer system, a desktop computer or any other computing device. The cloud provider system 104 may include one or more machines such as server computers, desktop computers, etc.

In one embodiment, the cloud provider system 104 is coupled to a cloud controller 108 via the network 102. The cloud controller 108 may reside on one or more machines (e.g., server computers, desktop computers, etc.) and may manage the execution of the Web applications in the cloud 130. In one embodiment, the cloud controller 108 receives commands from PaaS broker server 135. Based on these commands, the cloud controller 108 provides data associated with different applications to the cloud provider system 104.

Some of the clients 160-180 access the Web applications hosted on the VMs 111-122 as users. For example, a Web application can be an online social network or blog, and a client can log into the social network or blog to update content and generally use the functionality of the Web application. In one embodiment, each VM 111-122 is a multi-tenant node, meaning each VM can host multiple Web applications owned or managed by different clients. For example, VM 112 is shown hosting two applications of different users or customers, namely, App1 113 and App2 114. A client machine, such as client 1 160 can also be used to create and manage Web applications, such as for example App1 113 hosted by VM 112. As is explained in more detail below, in one embodiment, client 1 160 may be a machine used by a customer of a PaaS system to create or upload a Web application to be hosted by the PaaS system.

The client 160 can include tools 138. Alternatively, tools 138 can be provided by the PaaS broker server 135, and a user of the client 150 can access tools 138 via the browser 161, a command line, or other interface. The tools 138 can be used to issue commands that result in the PaaS broker server 135 creating and managing a Web application on one of the VMs, such as VM1 112, shown as hosting two applications (App1, App2). In one embodiment, the client 160 can also include a source code management (SCM) 139 system, such as Git, to manage version control and to send code to a remote repository on the host nodes 110-120.

In one embodiment, to identify VM1 as the node to create the Web application on, the PaaS broker server 135 can communicate with and collect information from the VMs using a server orchestration system 136. In one embodiment, the PaaS broker server 135 maintains application information 142 about each Web application being hosted on the VMs to track which VM each application is hosted on. Since each VM hosts multiple applications belonging to different application owners in a multi-tenant node environment, applications have specific identifiers as the identifier of the node can correspond to multiple applications. Unique identification of applications, along with sandboxing techniques including security, segregation, and isolation can be used keep each application from accessing or interfering with another application that may be managed by a different owner. For example, on Linux-based nodes, SELinux™ security labeling can be used to secure access to the applications and Linux control groups can be used to segregate application into different processing spaces, and kernel namespacing can be further used to segregate applications. Tools such as Diskquota™ can then be used to allocate separate resources to the isolated applications. Nodes running other operating system environments can use other such sandboxing techniques to segregate and isolate applications from one another and from the node operating system.

While various embodiments are described in terms of the environment described above, those skilled in the art will appreciate that the facility may be implemented in a variety of other environments including a single, monolithic computer system, as well as various other combinations of computer systems or similar devices connected in various ways.

Figure 2A:
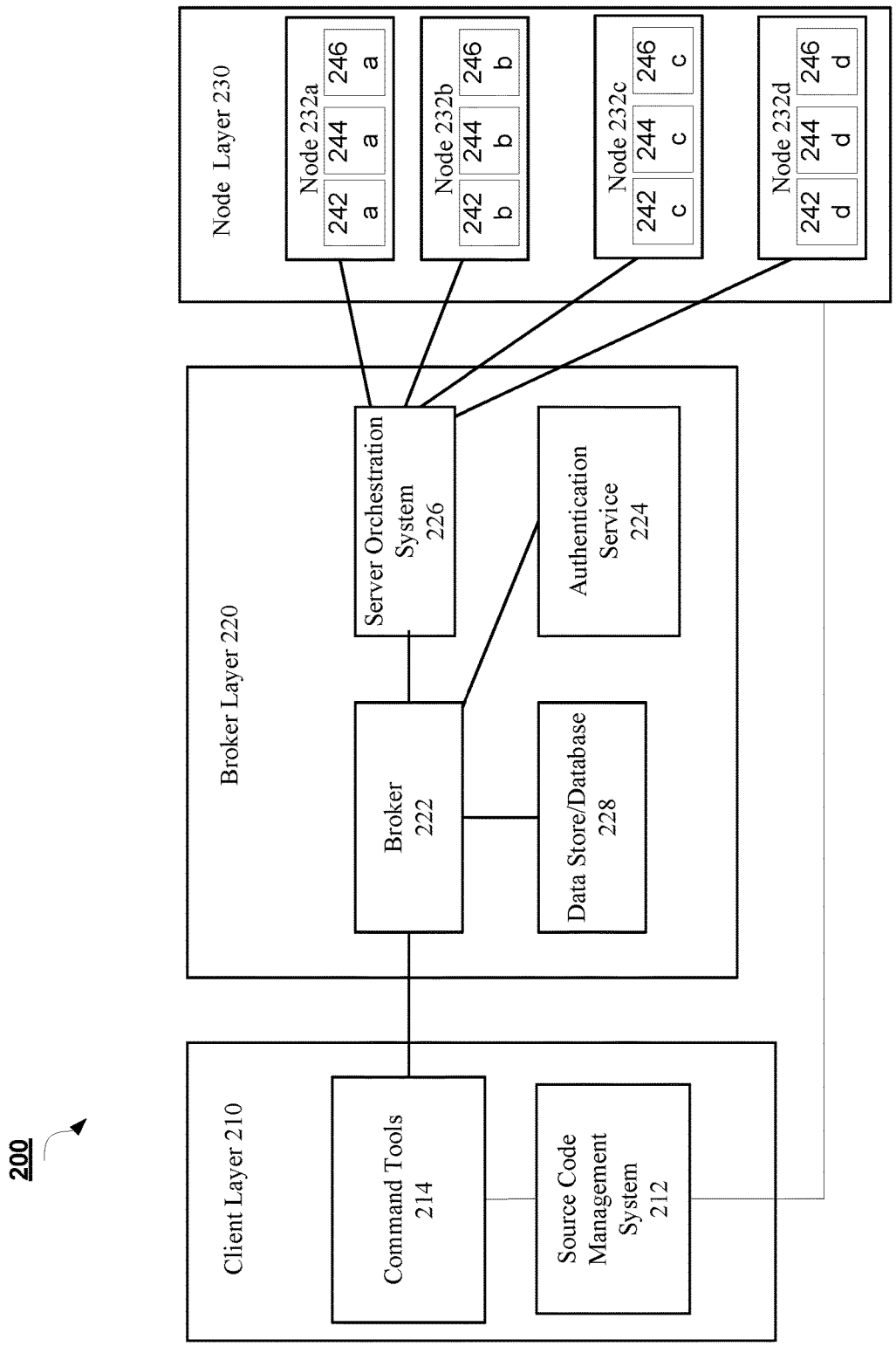
FIG. 2A is a block diagram of a PaaS system architecture according to an embodiment of the invention.

FIG. 2A is a block diagram of a PaaS system architecture 200. The PaaS architecture 200 allows users to launch software applications in a cloud computing environment, such as the could computing environment provided in network architecture 100 described with respect to FIG. 1. The PaaS architecture 200, in one embodiment, includes a client layer 210. In one embodiment, the client layer 210 resides on a client machine, such as a workstation of the software developer. In another embodiment, the client layer 210 resides on a server and is accessible to the client machine via the browser. The client layer 210 includes a source code management system 212, sometimes referred to as "SCM" or revision control system.

One example of such an SCM or revision control system is Git, available as open source software. Git, and other such distributed SCM systems, usually include a working directory for making changes, and a local software repository for storing the changes. The packaged software application can then be "pushed" from the local Git repository to a remote Git repository. From the remote repository, the code may be edited by others with access, or the application may be executed by a machine. Other SCM systems work in a similar manner.

The client layer 210, in one embodiment, also includes a set of command tools 214 that a user can use to create, launch, and manage applications. In one embodiment, the command tools 214 can be downloaded and installed on the users's client machine, and can be accessed via a command line interface or a graphical user interface, or some other type of interface. In one embodiment, the command tools 214 expose the application programming interface ("API") of the broker layer 220 and perform other applications management task in automated fashion using other interfaces, as will be described further below in accordance with some embodiments.

In one embodiment, the broker layer 220 acts as middleware between the client layer 210 and the node layer 230. The node layer 230 includes the nodes 232 on which software applications are provisioned and executed. In a multi-tenancy cloud hosting environment, each node 232 hosts multiple applications 242-246 or application components of different application owners (e.g., different customers of the PaaS system). For example, one node 232a, application 242a and 246a may have different owners.

As used herein, an "application owner," or simply "owner," is the person, persons, or entity that creates, operates, and/or manages an application. The application owner uses the client layer 210 to interact with each application owned by the owner on the node layer 230. The owner is thus the customer of the PaaS system 200. In contrast, a user of the application refers to the end user of the application, i.e., the customer of the application. As an example, a social network company can be the application owner, and a social network member using the social network application can be the user of the social network application.

Using multi-tenancy to host multiple applications belonging to multiple application owners saves resources, as multiple applications can utilize the operating system, middleware, communications resources, and other shared resources of the node 230. However, hosting multiple applications belonging to different application owners and operators on a single node results in various complications that are addressed by the embodiments set forth herein.

In one embodiment, each node 232 is a virtual machine (VM) provisioned by an Infrastructure as a Service (IaaS) provider, such as Amazon Web Services™. In other embodiments, the nodes 232 can be physical machines or virtual machines residing on a single physical machine. In one embodiment, the broker layer 220 is implemented on ore or more machines, such as server computer, desktop computer, etc. In some embodiments, the broker layer 220 may be implemented on one or more machines separate from machines implementing each of the client layer 210 and the node layer 230.

In one embodiment, the broker layer 220 includes a broker that coordinates some of the requests from the client layer 210 with actions performed at the node layer 230. One such request is new application creation. In one embodiment, when a user, using the command tools 214 requests the creating of a new application, or some other action to manage the application, the broker 222 first authenticates the user using an authentication service 224 such as Streamline™ or some other authentication tool. Once the user has been authenticated and allowed access to the system, the broker 222 uses a server orchestration system 226 to collect information and configuration information about the nodes 232.

In one embodiment, the broker 222 uses the Marionette Collective™ ("MCollective™") framework available from Puppet Labs™ to facilitate parallel job execution of the server orchestration system 226. The server orchestration system, in one embodiment, functions to coordinate server-client interaction between multiple—sometimes a large number of—servers. The servers being orchestrated in one embodiment are the nodes 232, which are acting as application servers and web servers.

For example, if the broker 222 wanted to shut down all applications on all even numbered nodes out of 100,000 nodes, the broker 222 would only need to provide one command to the server orchestration system 226. The server orchestration system 226 would—in one embodiment—generate a separate message to all nodes to shut down applications if the node is even, and distribute the messages to the nodes using a messaging and queuing system. Thus, in one embodiment, the broker 222 manages the business logic and model representing the nodes 232 and the applications residing on the nodes, and acts as the controller that generates the actions requested by users via the client tools 214 API. The server orchestration system 226 then takes those actions generated by the broker 222 and orchestrates their execution on the many nodes 232 managed by the system.

In one embodiment, the information collected about the nodes 232 can be stored in a data store 228. In one embodiment, the data store 228 can be a locally hosted database or file store, or it can be a cloud based storage service provided by a SaaS storage provider, such as Amazon™ S3™ (Simple Storage Service™). The broker 22 then uses the information about the nodes 232 and their applications to model the application hosting service and to maintain records about the nodes. In one embodiment, node data is stored in the form of a JavaScript Object Notation (JSON) blob or string that maintains key-value pairs to associate a unique identifier, a hostname, a list of applications, and other such attributes with the node.

Figure 2B:
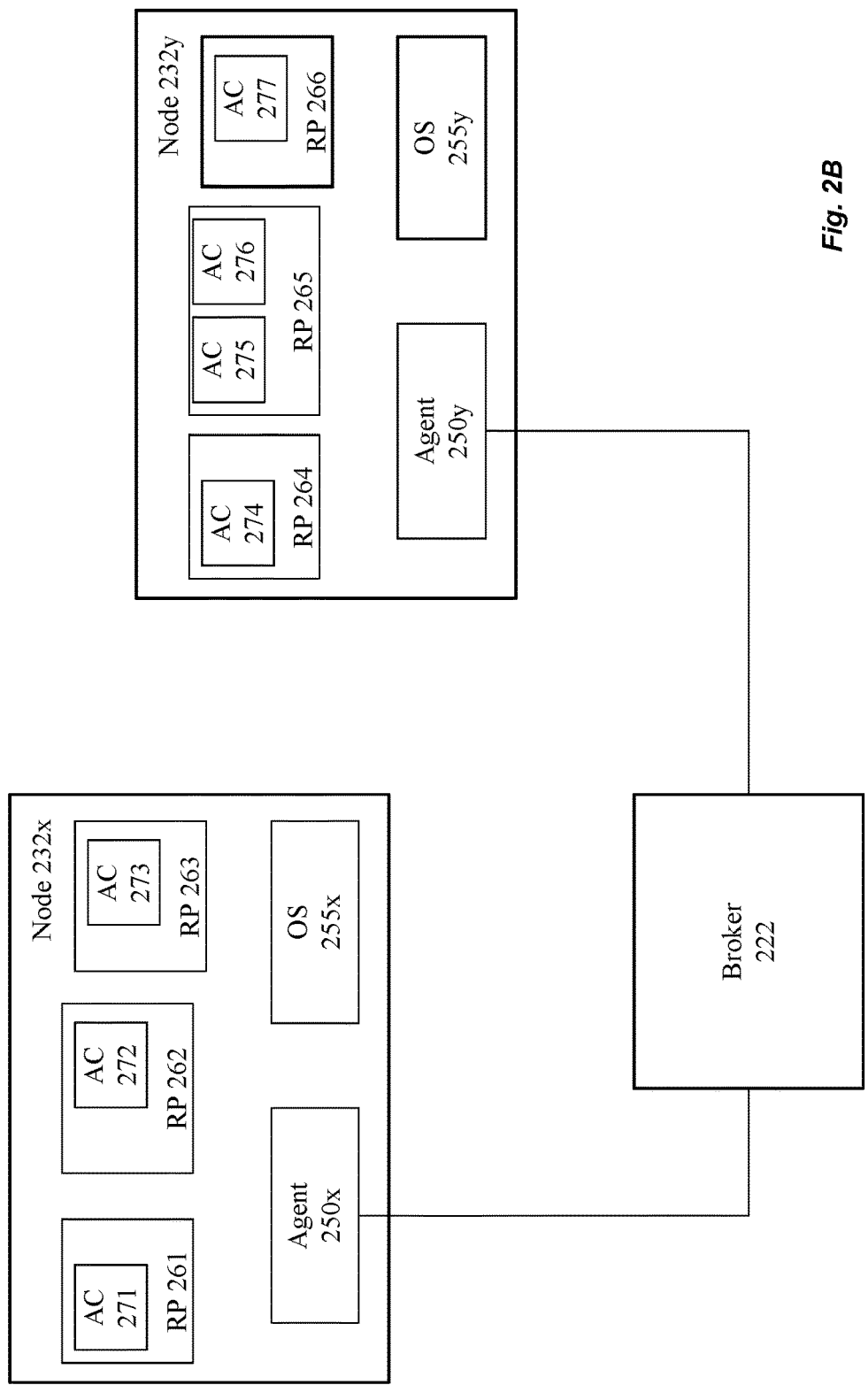
FIG. 2B is a block diagram a node layer of a PaaS system according to an embodiment of the invention.

Another embodiment of node architecture for nodes 232 is now described with reference to FIG. 2B. In one embodiment, nodes 232—which are virtual machines of a cloud-based IaaS environment—can be further subdivided into resource pools. For example, node 232x is shown to have three resource pools 261-263. Other embodiments can have any other number of resource pools per node, and the number of resource pools can vary between different nodes and implementations.

Each node 232 is allocated a certain amount of hardware and middleware resources, such as memory, processing cycles, communications, messaging, and other such provisions to implement a virtual machine. Each node 232 also has a node operating system 255 to manage and use those allocated resources. In one embodiment, a resource pool is a further division of those allocated resources into distinct and separate groups. As used herein, a resource pool refers to a collection of VM/node resources—such as processing cycles, memory, and middleware—that are districted away from other VM resources. In some embodiments, a resource pool includes a software cartridge that acts as middleware for an application component (for example, JBoss for an application server component of a composite application). The resource pools can be managed by the node operating system 255.

In one embodiment, the resource pools are segregated from each other, so that each resource pool accesses common node resources as if it were the only resource pool on the node. This allows multiple resource pools to share some node resources (such as an HTTP server and the underlying node operating system). In one embodiment using a Linux-based node, resource pools are segregated from each other using SELinux™ security labeling, Linux control groups, and kernel namespacing, as described above. Nodes running other operating system environments can use other such sandboxing techniques to segregate and isolate resource pools from one another and from the node operating system. Communications between the broker 222 and the nodes 232 can be coordinated by an agent 250 of a server orchestration system or other messaging platform, as described further below.

In one embodiment, applications are not only associated with a node 232 and a software repository on the node, but with a resource pool. In one embodiment, one resource pool contains only one application, or multiple applications owned by the same client. In such an embodiment, the resource pools are used as the security and segregation container to implement multi-tenancy.

In yet other embodiments, the applications hosted by the PaaS system include composite n-tier Web applications that have several separate components, such as a Web server, and application server, and a database, all implemented separately. In such an embodiment, each application component can be provided a different resource pool, although several application components owned by the same application owner can reside in the same resource pool.

For example, node 232y is shown as having three resource pools 264-266. Each resource pool is hosting an application component 274-277. Resource pools 264 and 266 host one application component each, applications components 274 and 277 respectively. Resource pool 265 is hosting two separate application components 265, 276. In one embodiment, the two separate application components 265, 276 being hosted by resource pool 265 are components of the same composite application, but in other embodiments, they may be components of different applications owned by the same application owner (PaaS customer), or two different applications owned by the same application owner.

In one embodiment, different components of one composite application can be hosted by different resource pools. For example, application component 271 and application component 272—hosted by resource pool 261 and resource pool 262 respectively—can be two components of the same composite application. In one embodiment, different components of one composite application can further be hosted by different resource pools residing on different nodes 232.

For example, application component 271 and application component 277—hosted by resource pool 261 of node 232x and resource pool 266 of node 232y respectively—can be two components of the same composite application.

While much of the discussion herein is set forth in terms of applications—as a whole—for simplicity, many facets, techniques, implementations, and embodiments can be applied to application components without loss of generality. For example, when determining which node of the PaaS system to select to host an application as described further below, the same or similar methodologies and systems can be used to determine which node of the PaaS system to select to host an application component. By way of another example, communications and interfaces between the client layer and applications described further below, are equally applicable to application components instead of applications. Thus, as used herein throughout, the terms "application" and "application component" can be used interchangeably where appropriate.

Figure 3A:
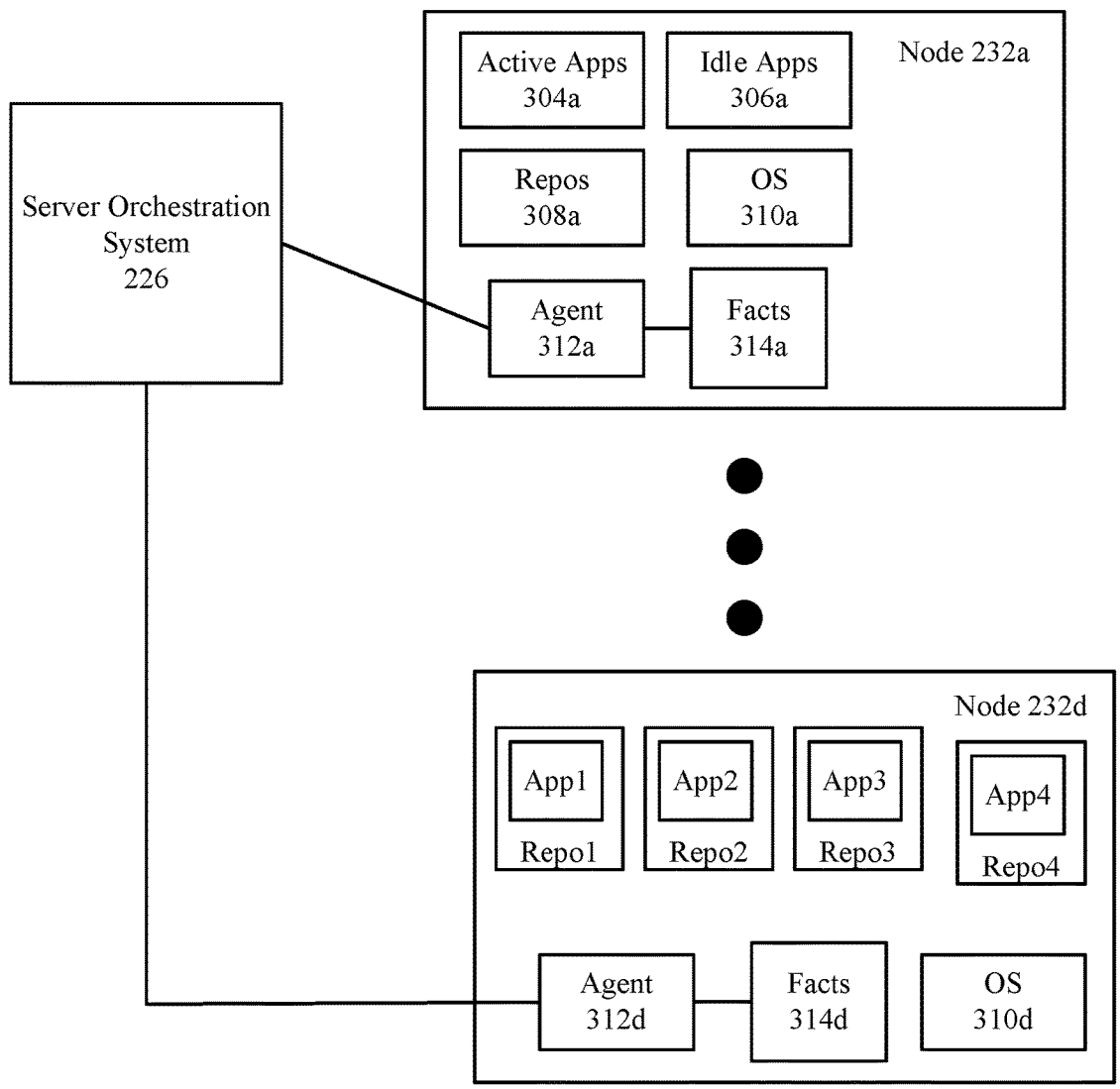
FIG. 3A is a block diagram of a communication infrastructure between a server orchestration system and a node according to an embodiment of the invention.

One embodiment of the interaction between the server orchestration system 226 and the nodes 232 is now described in more detail with reference to FIG. 3A. Each node, which in one embodiment is implemented as a virtual machine, has an operating system 310 that can execute applications (e.g., applications with source code stored in the various software repositories 308 resident on the node 232). In one embodiment, each repository is associated with a resource pool. In other words, a resource pool contains an application cartridge including middleware specific to an application hosted in the repository contained in the resource pool. A resource pool, in one embodiment, can be conceptualized as a security-segregated and resource-constrained container configured to host an application cartridge (middleware and/or runtime environment) and an application or application component.

For a composite application, the components of the application can be spread out over multiple resource pools. In such an embodiment, one of the resource pools acts as the interface front end of a distributed repository. Thus, one resource pool will contain the main repository that is aware of the current location of all the distributed repositories in other resource pools. When such components or resource pools are relocated, the main repository can be updated by its node using information provided by the broker or its server orchestration system 226 that it collects from these other nodes.

The nodes also include an agent 312 configured to track and collect information about the nodes 232 and to perform actions on the node. Thus, in one embodiment using MCollective for the server orchestration system, the agents 312 can act as MCollective servers. The server orchestration system 226 would then act as the MCollective client that can send requests, queries, and commands to the agents 312. The agent 312 collects information about the node on which it resides.

In server management terminology, such information is referred to as "facts." For example, one fact is which operating system is installed on the node. Facts are generally stored as key:value pairs, such as "Kernel:Linux," "Hostname:Server1422," IP Address:23.43.65.676." The server orchestration system 226 allows the agents to gather information about facts not originally intended. Such extensions are referred to as "custom facts."

In some cloud platform systems, each new application owned by a different owner or customer is given its own node, meaning a new virtual machine is created for such an application. However, in a multi-tenancy platform system, one node can host multiple—even hundreds of applications owned by potentially hundreds of different application owners or customers. In one embodiment, the PaaS system of FIG. 3A is a multi-tenant PaaS environment. Thus each node 232 runs multiple applications 235 that may be owned or managed by different users and/or organizations. As such, a first customer's deployed applications may co-exist with any other customer's deployed applications on the same node (VM), and multiple software repositories can exist on the same node.

In one embodiment, the agent 312 is configured to maintain a custom fact to track the number of software repositories on the node. For example, the name of the custom fact can be "Repos," and its current integer value, such as 30, would indicate 30 repositories each containing a Web application or a component of a Web application, being hosted on the node 232. This is not the type of standard fact maintained by a server orchestration system, such as CPU usage and memory usage. Furthermore, since in a single tenant hosting environment the application owner would be aware of the number of applications and application component it owns and manages, such a custom fact would be unnecessary in a non-multi-tenancy application hosting environment. In one embodiment, the number of repositories being hosted on a node can be used as a factor when determining the capacity of a node to host additional applications or application components.

In one embodiment, the agent 312 periodically queries the node 232, for example the operating system 310, to determine the number of software repositories 308 and updates a custom fact with the identified number of repositories. In another embodiment, the agent 312 can track application creation and destruction to track changes in the number of software repositories (e.g., if a software repository is created in response to application creation or removed in response to application destruction) and update the corresponding custom fact accordingly.

In one embodiment, the agent 312 is configured to maintain a custom fact to track the number of resource pools instantiated on the node. For example, the name of the custom fact can be "Resource Pools," and its current integer value, such as 10, would indicate 10 resource pools—each containing a Web application, a component of a Web application, or several applications or components owned by one owner—being instantiated on the node 232. Since in a single tenant hosting environment applications would not be segregated into resource pools, such a custom fact would not make sense in a non-multi-tenancy application hosting environment that does not implement resource pools. In one embodiment, the number of resource pools being instantiated on a node can be used as a factor when determining the capacity of a node to host additional applications or application components in either existing or new resource pools.

In one embodiment, the agent 312 periodically queries the node 232, for example the operating system 310, to determine the number of software resource pools and updates a custom fact with the identified number of resource pools. In another embodiment, the agent 312 can track resource pool creation and destruction to track changes in the number of resource pools, and update the corresponding custom fact accordingly.

In one embodiment, the applications or application components residing in the software repositories contained in the resource pools are either executing or not. For example, an application may currently be stopped by its owner, or the application may not have been started yet. In one embodiment, the agent 312 is also configured to track the number of active applications 304, which can be defined as the applications that are currently executing, and thus consuming more resources than the applications that are not executing. The number of active application 304 can also be tracked as a custom fact. Yet another custom fact can be the number of idle applications 306. Several embodiments of idle applications are described below with reference to FIG. 3B and FIG. 3C.

Another view of a node is shown as node 232d. Node 232 shows multiple Web applications (App1-App4) residing on the node 232d. Each application resides in an SCM repository, Repo1-Repo4, respectively. Thus, the agent 312d would discover four repositories on the node 232d and maintain that number as a custom fact. As an example, App1 may be stopped by a user, or never started, App2 and App3 may be active executing Web applications that are executing in two separate threads in the operating system 310d, and App4 may be an idle Web application that is not currently executing due to low or no application usage. In this example, the custom fact representing active applications would be two, and the custom fact representing idle applications would be one. Custom facts can be defined using a utility program, such as Facter, and collected by running scripts on the node accessible to the node operating system. For example, a script can define a Facter custom fact of git_repos and count the number or .git files in the directory of the host VM to populate the custom fact. Similarly, scripts can count applications having certain states in the node directory (e.g., active, idle, stopped) to determine custom facts for the number of active applications, idle applications, and the node capacity, as discussed further below.

As set forth above, the number of idle application on a node can be maintained, tracked, or determined, and stored, for example, as a custom fact. In one embodiment, an idle application is an application hosted on the node that has been started at some point by its owner, and even though the application has not been shut down by its owner, its low usage—by the end users of the application, by the owner, or both—does not justify the resources used to keep the application running. Such applications can be idled. In one embodiment an idled application is shut down to keep it from consuming node resources, but provisions are made to ensure that if a user accesses the application over the internet—for example a reader of a blog requests the website of the blog, or a member of a social network logs into their profile—the application is restarted in a manner transparent to the user.

Figure 3B:
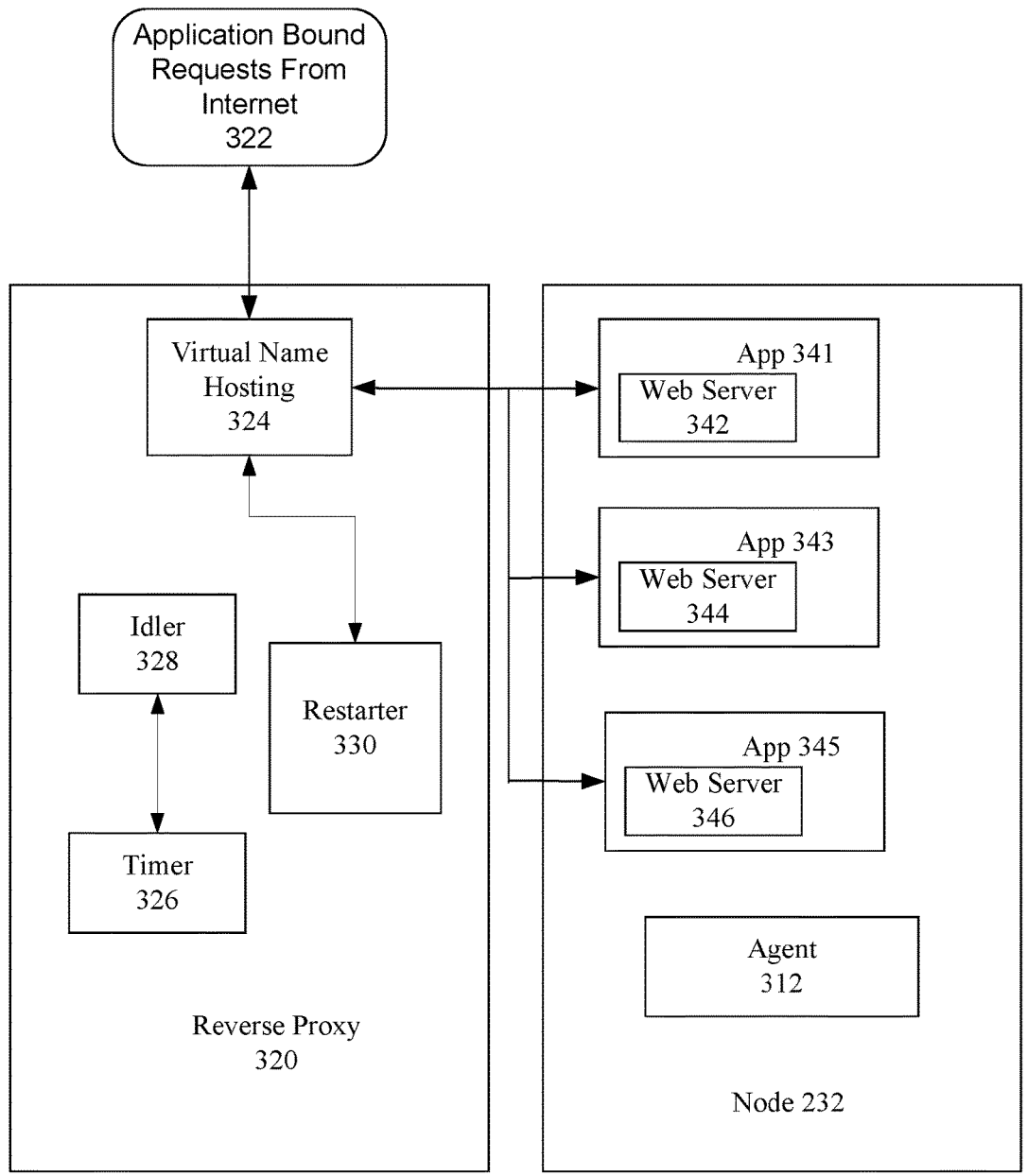
FIG. 3B is a block diagram of a implementing idling using a reverse proxy server according to an embodiment of the invention.

One embodiment of implementing idling an application hosted on a node of the PaaS system is now described with reference to FIG. 3B. FIG. 3B is a block diagram illustrating a node 232 of the PaaS system and a reverse proxy 320 used, in part, to implement multi-tenancy on the node 232. As set forth above, the node includes several applications 341, 343, 345 being hosted on the node 232. In one embodiment, each application is a Web application and includes a Web server 342, 344, 346, respectively, to handle Web requests bound for each application. The node 232 also includes an agent 312, to allow the broker layer to manage the node 232, and an operating system (not shown).

In one embodiment, each node of the PaaS system has an associated reverse proxy server 320 that is responsible for monitoring applications running on the node and detecting when any of these applications become idle and/or when any of the idle applications should be reactivated. The associated reverse proxy server 320 can be implemented on the same VM as the node, or on a different VM than the node (as shown in FIG. 3B), which may in turn be hosted by the same physical machine as the node or a different physical machine then the node. In one embodiment, the reverse proxy 320 implements virtual name hosting 324 to provide multi-tenancy support to the node 232. By providing a virtual name hosting module 324, multiple applications having different URLs (e.g., application 341 www.blogsrus.com and application 343 www.mycarclub.com) can be hosted on a node 232 having a single internet protocol (IP) address.

When Web requests 322 bound for an application (e.g., application 343 the Car Club site) arrive at the reverse proxy 320, they are redirected to application 343 according to the configuration of the virtual name hosting module 324. In one embodiment, the reverse proxy 320 includes a timer 326 that tracks one or more usage and/or access statistics for each application and triggers certain actions when minimum usage thresholds for the access statistics are not met. For example, the timer 326 may be set to time out if an application is received no HTTP requests from a user over the Internet for a week and the owner has not logged in to manage the application in over two weeks. For example, the car club application 343 may not have anyone visiting the site in over a week and/or its owner may have lost interest in managing the car club website.

In one embodiment, when the timer 326 times out or otherwise indicates that an action is needed, the timer 326 alerts an idler 328 of the reverse proxy 320 of which application met or exceeded an idling condition threshold. The idler 328, in response to the information from the timer 326, then proceeds to idle the identified application. In one embodiment, the idler 328 can be implemented as a script or other code residing on the reverse proxy, but the idler can reside elsewhere. The timer 328 and the idler 326 can be implemented as a single module or as separate modules, such as in FIG. 3B. Several embodiments of processing performed by the idler 328 to idle an application will be described in more detail below with reference to FIG. 3C.

In one embodiment, the reverse proxy 320 also includes a restarter module 330 to transparently restart an idle application. Various actions or triggers can activate the restarter 330. For example, in one embodiment, receiving an HTTP request 322 from a user of the idle application over the internet causes the restarter 330 to restart the application and to provide the functionality of the application to the user as if the application was always executing. Several embodiments of processing performed by the restarter 330 to restart an application will be described in more detail below with reference to FIG. 3D.

Figure 3C:
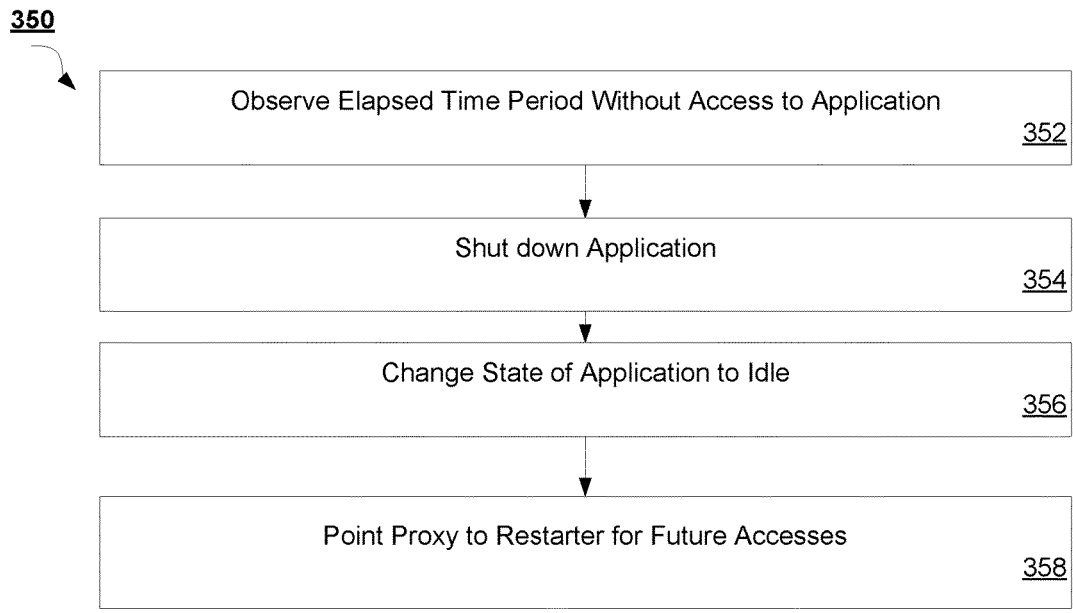
FIG. 3C is a flow diagram illustrating a method for idling an application according to an embodiment of the invention.

FIG. 3C is a flow diagram illustrating a method 350 for idling an application hosted on a node of a PaaS system according to an embodiment of the invention. Method 350 may be performed by processing logic that may comprise hardware (e.g., circuitry, dedicated logic, programmable logic, microcode, etc.), software (such as instructions run on a processing device), firmware, or a combination thereof. In one embodiment, method 350 is performed by the reverse proxy 320 and the idler module 328 of FIG. 3C.

Method 350 begins at block 352 with the observation that some threshold period of time has elapsed without an access to one of the Web application hosted on one or more of the nodes of the PaaS system. In other embodiments, even if some access has occurred within the timeout window, if a minimum level of access is not maintained, the threshold for insufficient access can be triggered. In one embodiment, user accesses to the Web application in the form of HTTP requests to the Website are monitored for access, and a lack of HTTP requests targeting the application within some threshold time period trigger idling. In other embodiments, git push commands, git commits, or other accesses by the owner are also monitored for sufficient volume of access.

Both the threshold time period and the minimum usage required can vary, and can depend on multiple factors. In one embodiment, both can be configured by administrators of the PaaS system. One example policy can be to idle any Ruby Web application that has not received an HTTP request in 5 days, unless the owner of the application uploaded new code to the repository within the last week. The logs of the code repository can be examined to determine the timing of commits and push operations. The timer 326 can monitor the HTTP requests received at the reverse proxy 320 to trigger idling events. Various other idling policies are possible.

At block 354, the application is shut down in response to the elapsed threshold observation. In embodiment, the timer 326 signals the idler 328 that an application should be idled in response to having triggered an idling policy. The idler, in one embodiment, instructs the agent 312 of the node associated with the reverse proxy 320 to shut down the application. In other embodiments, the idler can communicate with the node operating system directly to shut down the target application. The application can be shut down in the normal manner, as if the instruction to shut down or stop the application came from the client layer (e.g., the owner of the application shutting down the application) or the broker layer. In one embodiment, the state of the application is saved by the node, and this state can be accessed when restarting the idle application.

At block 356 the state of the application is changed from active to idle. The state information about the application can be maintained by the reverse proxy 320, by the node as an application attribute, as a custom fact, or all of the above. In one embodiment, the node—for example the agent 312—maintains a custom fact about the number of idle applications, as set forth above. Such custom fact can be updated using the changed status of the application being idled.

At block 358, the reverse proxy 320 is reconfigured to point incoming requests and accesses (such as HTTP requests) to the restarter 330, or other such module whose purpose is to restart an idling application. The restarter 330 can be a script, and, in one embodiment, a pointer to the restarter script can replace the pointer to the Web server of the target application in the virtual name hosting module 324. Thus, for an idle application, accesses to the application are not provided to the application—since it is not running—but instead are provided to a restarter.

Figure 3D:
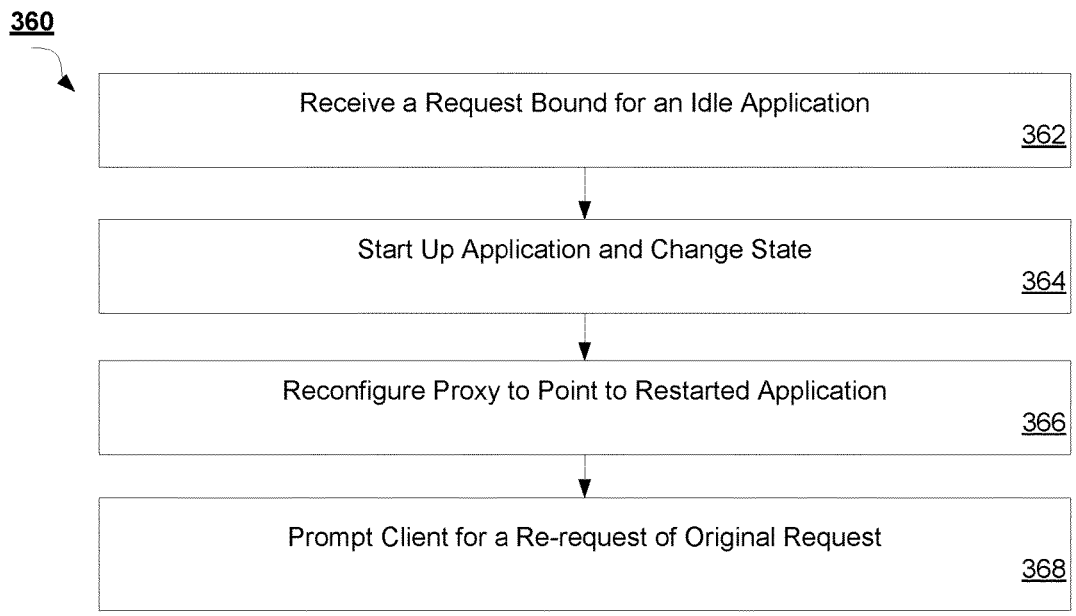
FIG. 3D is a flow diagram illustrating a method for restarting an idle application according to an embodiment of the invention.

FIG. 3D is a flow diagram illustrating a method 360 for restarting an application hosted on a node of a PaaS system according to an embodiment of the invention. Method 360 may be performed by processing logic that may comprise hardware (e.g., circuitry, dedicated logic, programmable logic, microcode, etc.), software (such as instructions run on a processing device), firmware, or a combination thereof. In one embodiment, method 360 is performed by the reverse proxy 320 and the restarter module 330 of FIG. 3C.

Method 360 begins at block 362 with receiving a request—such as an HTTP request—at the reverse proxy that is an access to the idle application and addressed to the idle application. Since the application is idle, the reverse proxy 320 is configured to redirect requests bound for the application to the restarter 330. In response to receiving the request, the restarter 330, at block 364 starts up the application and changes the state of the application back from idle to active. In one embodiment, the restarter can instruct the agent 312 of the node to start running the application, or can effect the starting of the application directly with the node operating system using various interprocess communication and task automation techniques. Any saved application state information can be accessed by the node to return the application to the state it was in when idled.

As discussed above, the current state of each application can be maintained by the reverse proxy, the node, or both. In one embodiment, the restarter also causes an update to the status of the application back to "active." Such update can further cause an update to the custom fact tracking the number of idle or active applications that is maintained, in one embodiment, by the agent of the node.

At block 366, the reverse proxy is reconfigured to point the virtual name hosting module back to the restarted application instead of the restarter. Thus, future HTTP requests and other accesses to the restarted application will once again be redirected to the application. Then, at block 368, the client machine of the user that originated the request (e.g., a visitor to the Website powered by the application) is prompted to resend the original HTTP request that was received in block 362. In one embodiment, this is done by the restarter script sending a redirect to the reverse proxy itself in response to the received HTTP request.

In this manner, and according to other such embodiments, applications that are not being used or accessed enough can be shut down to preserve node resources, but in a manner that is transparent to the users and owners of the application. Such application idling capability is especially valuable in a multi-tenancy node environment, because a node can host many applications or application components many of which may never be accessed, be accessed only infrequently, or left abandoned after some time.

As set forth above, when referring to an application herein, a similar process can be implemented to apply to a component of an n-tier composite application. For example, for the idling processing, it may not be an entire application that becomes underutilized. Rather it may be a component of a composite application that is contained in a different resource pool from that is not meeting minimum usage thresholds. For example, users may be interacting with a website, but not saving any data or creating accounts, thus resulting in an active Web server, but an idle database executing in a different resource pool. In such an embodiment, the database server can be idled according to the processing described above, with the application component being treated as the application.

Figure 4:
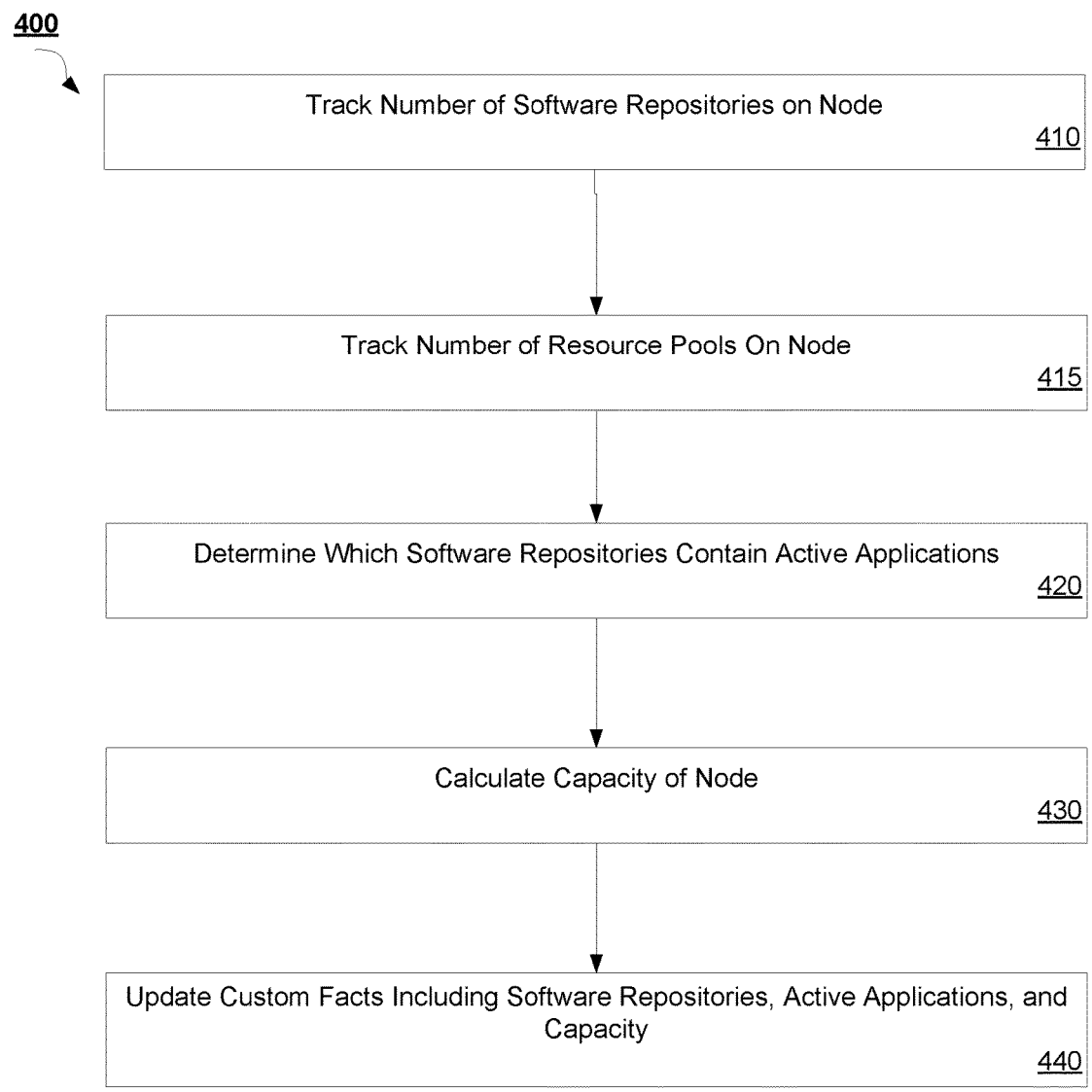
FIG. 4 is a flow diagram illustrating a method for determining custom facts for a node according to an embodiment of the invention.

FIG. 4 is a flow diagram illustrating a method 400 for tracking various custom facts on a node according to an embodiment of the invention. Method 400 may be performed by processing logic that may comprise hardware (e.g., circuitry, dedicated logic, programmable logic, microcode, etc.), software (such as instructions run on a processing device), firmware, or a combination thereof. In one embodiment, method 400 is performed by the agent 312 of FIG. 3.

Method 400 begins at block 410 with tracking the number of software repositories on the node. In one embodiment, whenever a software application is created, deleted, or undergoes state change (e.g., active to idle), instruction to perform the specified action is distributed using the message broker of the server orchestration system. In another embodiment, the agent can periodically discover the number of software repositories on a node.

In one embodiment, a software repository is a data structure that contains source code for an application, various files and directories used by the application, and a historical record of changes in the repository and other such revision control items. Software repositories can also include various security and completeness checks, such as digital signatures to authenticate the repository and checksums to ensure completeness of the repository. To discover the number of software repositories on a node, in one embodiment, the agent can query the operating system of the node about the number of software repositories currently resident on the node (e.g., using a utility such as Facter™ available from Puppet Labs™ to communicate with the operating system) and can store this information as one of the facts. The agent can then retrieve and manage the custom facts described herein, such as the number of software repositories being hosted on the node.

At block 415, the number of resource pools is tracked. In some embodiments, each resource pool hosts only one repository. In such embodiments, the number of resource pools will equal the number of software repositories. However, in other embodiments, a resource pool can host multiple repositories that may have some connection, such as being managed by the same owner and being different components of one composite application.

In block 420, a determination is made as to which software repositories contain active applications. In one embodiment, active applications are all applications that have been started by their owners and that have not been stopped. Since, in one embodiment, "start" and "stop" commands involve application state changes that pass though the agent, the agent can track the number of active applications by incrementing the active application count whenever an application is started and decrementing it whenever an application is stopped.

In another embodiment, as set forth above, applications may also be idle without intervention of the owner of the application. In such an embodiment, the agent can be configured to receive a notification whenever an application starts idling and is reactivated. For example, the agent can subscribe to notifications for changes in the status of applications—e.g., from active to idle—or can maintain an application status indicator itself. In one embodiment, each time an application begins to idle, the active application count can be decremented, and every time an idle application is reactivated, the active application count can be incremented.

In one embodiment, the capacity of the node to host additional applications or application components is calculated in block 430 and also stored as a custom fact. The capacity of a node is its capacity to host additional applications or application components. A new application or component may be hosted in a new or unallocated resource pool. Furthermore, in some embodiment, a new application or application component can be hosted in an existing resource pool as long as the resource pool has the capacity and hosts applications and components owned by the same application owner.

As the multiple applications of a multi-tenant node increase in number, they use more of the resources of the node, thereby decreasing the capacity of the node to host more applications. At some point, the node will be operating at full capacity, which can be defined by a significant deterioration in the performance of the hosted applications were additional applications added. Various embodiments for calculating the capacity of the node will be described in detail further below. For example, the capacity of a node can be calculated using the number of repositories as an indication of the node's ability to host additional applications.

As mentioned above, the various custom facts described are maintained by the agent—including but not limited to the number of software repositories, the number of active applications, the number of idle applications, and the capacity of the node. At block 440, the agent updates the custom facts with the most recent values determined as discussed above. The custom facts maintained by the agent can be used in a number of ways to support various platform operations. For example, as described further below, the number of software repositories, the number of resource pools, the number of active applications, the number of idle applications, and the capacity of the node, can all be used when selecting a node on which a new application or application component is to be hosted from a set of available nodes that already host other applications in a multi-tenant environment.

Figure 5:
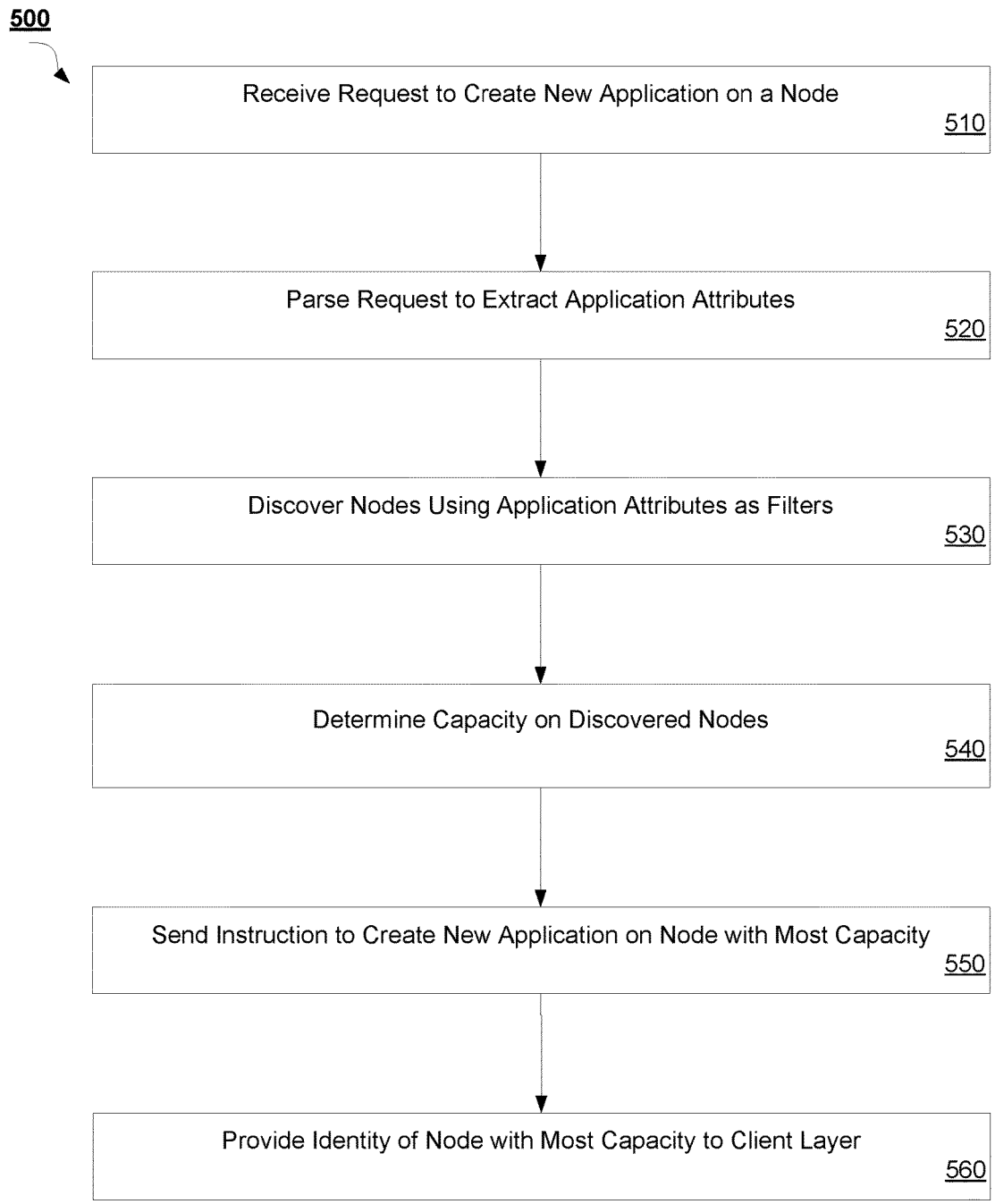
FIG. 5 is a flow diagram illustrating a method for creating a new application on a node according to an embodiment of the invention.

As discussed above, a user may request to create a new application (e.g., using the command tools 214). One embodiment of creating a new application is now described with reference to FIG. 5. FIG. 5 is a flow diagram illustrating a method 500 for selecting a node from a number or available nodes on which to create a new application according to an embodiment of the invention. Method 500 may be performed by processing logic that may comprise hardware (e.g., circuitry, dedicated logic, programmable logic, microcode, etc.), software (such as instructions run on a processing device), firmware, or a combination thereof. In one embodiment, method 500 is performed by the broker 222 of FIG. 2.

Method 500 begins at block 510 where a request to create a new application or application component is received from the client layer. As explained above, in some cloud platform systems, each new application of a different owner or customer is given its own node, meaning a new virtual machine is created for each such application. However, in a multi-tenancy platform system, one node can host multiple—even hundreds of applications owned by different PaaS customers and/or organizations. In one embodiment, the PaaS system of FIG. 2 is a multi-tenant PaaS environment. Thus each node 232 runs multiple applications 235 that may be owned or managed by different users and/or organizations. As such, a first customer's deployed applications may co-exist with any other customer's deployed applications on the same node (VM).

At block 520, the request to create the new application is parsed to extract any application attributes included in the request. One application attribute can be a software type of the application, such as PHP, Ruby, JBoss, JavaSript, and other such high-level languages in which applications are developed. In one embodiment, the number of different types of applications can be stored and updated as a custom fact, as explained above.

Another possible application attribute can be application size. This can be measured in terms of sheer memory used by the application code, or by the anticipated memory footprint of the application. The memory footprint of the application refers to the memory used or referenced by the application during execution. In one embodiment, the application size is user selectable from a list of two (e.g., "small" or "large") or three ("e.g., "small" "medium" or "large") options. In one embodiment, the number of applications of various sizes can be stored and updated as a custom fact, as explained above. Furthermore, whether the node is configured to host small or large applications can also be stored and maintained as a custom fact, as explained above.

Another possible application attribute can be geographic or network location. This can be a logical zoning, districting, or other such partitioning of the node farm into various classifications or districts. For example, different clouds can be classified as different districts. Similarly, nodes residing on servers in different physical geographic areas (e.g., Japan) can be classified as different districts. Thus, a German social network application may be hosted on a node farm in Europe to optimize network bandwidth and latency. In one embodiment, district to which each node belongs can be stored and updated as a custom fact, as explained above.

At block 530, the set of available nodes on which the new application can be created is discovered using the extracted application attributes (e.g., available nodes hosting middleware to be used by the new application). For example, if the new application to be created is a PHP application, then nodes that have PHP installed are discovered. In another embodiment, if a new application or component is to be included in a resource pool that already contains an application or component, then nodes are filtered to include only nodes containing resource pools owned by the PaaS customer requesting the new application. If no appropriate node is discovered, then a new node can be dynamically created using the cloud IaaS provider and configured according to the needs of the new application or component.

According to another example, the new application requested can be a large Ruby application. In such a case, in block 530, nodes configured for large applications and with a Ruby interpreter installed would be discovered and identified to the broker. The size of the application (i.e., large, medium, small) can be measured by the language/IDE used, by the application type/function, by the size of the code, or by other such means. For example, a PHP application that returns a weather code or stock quote can be a small application, whereas a JBoss application with database backend can be a large application. The broker may perform additional filtering based on node attributes instead of application attributes. For example, the broker might filter the set of available nodes to include only nodes in a certain geographic region (e.g., Japan) or only nodes belonging to some logical or geographical organization of nodes. In yet other embodiments, the filtering may be to exclude nodes that already host an application, component, or resource pool managed by the requesting owner, in order to spread the risk of node failure among multiple PaaS system customers.

In one embodiment, the broker uses the server orchestration system 226 to discover the nodes on which the new application can be hosted. This is one example of using the facts maintained by the agents on the node—including the custom facts—by the broker layer. In the example above, large Ruby applications are discovered by the broker requesting the information from the server orchestration system 226. The server orchestration system 226 then sends a query to all nodes to respond if they satisfy the filter criteria, based on their custom facts.

In block 540, the current capacity on the discovered nodes is determined. A node with more capacity has more unused resources, and can thus be a more desirable location for creating a new application. Various processes for determining node capacity will be described in more detail further below. In one embodiment, the node capacity is calculated by the broker 222 based on gathered information, but it can be pre-computed on the nodes, and gathered by the broker 222 as one of the pieces of information.

In the embodiment described above, the processing described with reference to blocks 530 and 540, is performed dynamically, with live discovery of available nodes over the network and the dynamic calculation of the capacity of each discovered node. However, in another embodiment, information about the nodes and the applications residing on the nodes is stored in a data store accessible by the broker. Such information about the nodes can include the pre-calculated capacity of each node. Thus, in one embodiment, block 530 is performed by accessing information about nodes in the data store and block 540 is performed by retrieving the capacity of the identified nodes from the data store.

At block 550, the broker instructs the node having the most capacity to create the new application or application component. In one embodiment, the node having the most capacity includes one or more applications or application components of PaaS customers other than the owner of the new application. In one embodiment, the broker can send an instruction to the selected node using the server orchestration tool. In other embodiments, the broker can access the selected node directly to instruct the creating of a new application. If no appropriate node is located at block 530, or all discovered nodes are determined to be at full capacity at block 540, then a new node can be created, that is appropriate for the new application based on the application attributes In one embodiment, in response to the instruction sent to the selected node to create the new application, the node creates a new software repository on the identified node and populates the software repository with a template application. The node layer then uses a Domain Name System (DNS) to assign a host name to the application, and returns an application host name to the broker. The broker then can generate a unique system identifier and associate it with the host name of the application.

At block 560, the broker identifies the node selected for the new application to the client layer. This can be done by sending the host name of the application to the client tools to be presented to the user. The broker can also send the unique application identifier to the client tools. In one embodiment, the client can then pull the new software repository to the client machine to synchronize the local software repository on the client machine with the new software repository on the node.

Revisions to the application can then be pushed directly from the client layer (local SCM repository) to the node on which the application resides (remote repository). Since the application is secured and segregated on the node, such SCM push actions can identify the application or its resource pool by using a unique ID (UUID) assigned to the application by the broker and a secure channel interface (such as SSL) to log into the application being managed by the application owner. Thus, the local SCM can log into the node and because of the security and segregation features of multi-tenancy (such as kernel namespacing and the individual process space allotted to the resource pool containing the local repository), be only given access to the remote repository associated with the local repository managed by the owner.

As set forth above, in a multi-tenant cloud PaaS system, a concept of the capacity of a node to host additional applications can be helpful to identify which node to select for the creation of a new application in response to a request from the client layer. By hosting multiple applications of different application owners on nodes, a new node need only be instantiated when no current node exists with the appropriate configuration and the capacity to host a new application. Several embodiments of determining node capacity in a multi-tenant could platform are now described with reference to FIG. 6. The processing described with reference to FIG. 6 is, in one embodiment, a more detailed explanation of block 540 of FIG. 5 that can be performed on each discovered node.

Figure 6:
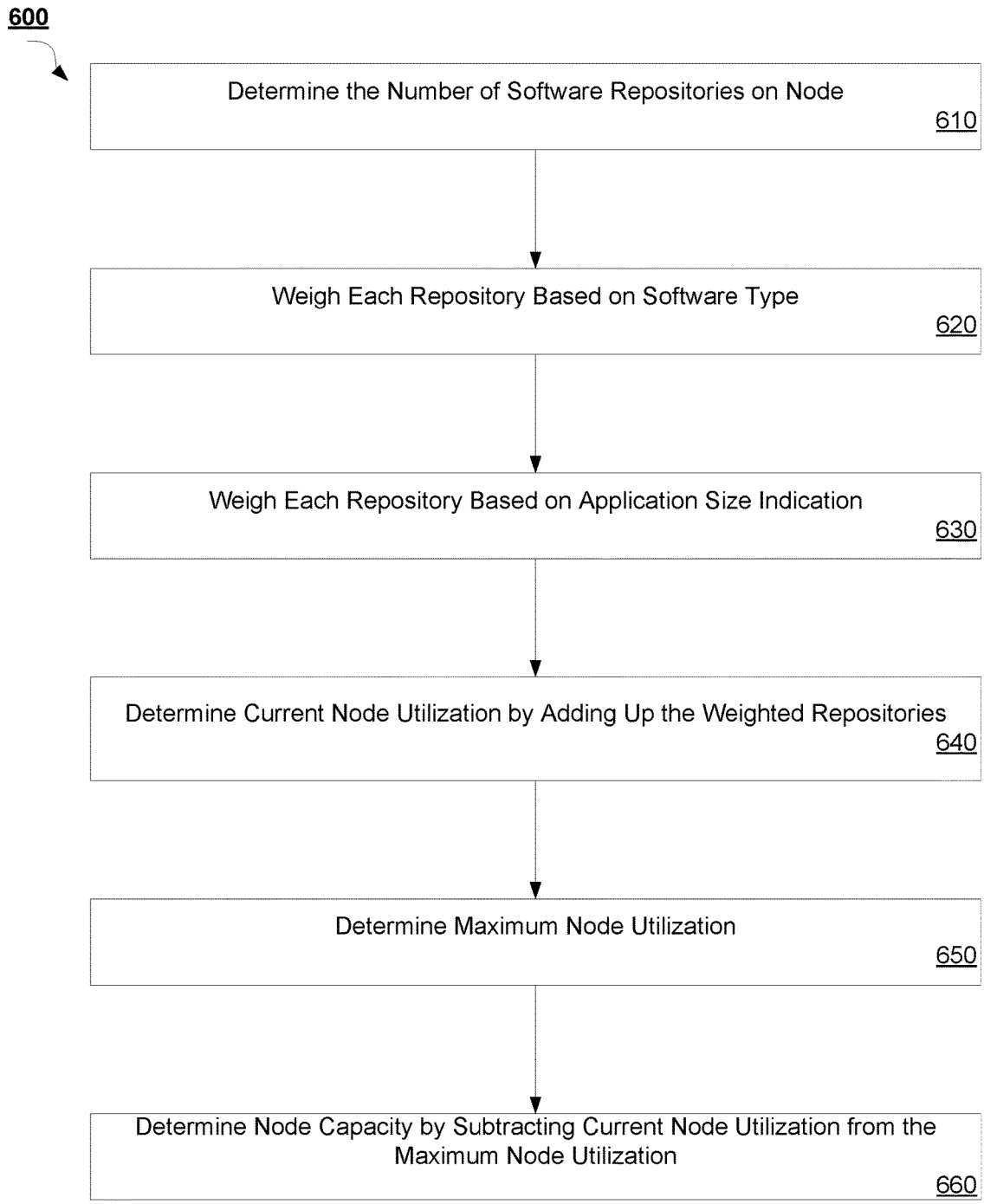
FIG. 6 is a flow diagram illustrating a method for calculating the capacity of a node to host a new application according to an embodiment of the invention.

FIG. 6 is a flow diagram illustrating a method 600 for determining the capacity of a node according to an embodiment of the invention. Method 600 may be performed by processing logic that may comprise hardware (e.g., circuitry, dedicated logic, programmable logic, microcode, etc.), software (such as instructions run on a processing device), firmware, or a combination thereof. In one embodiment, method 600 is performed by the broker 222 of FIG. 2 or the agent of FIG. 3A.

Method 600 begins at block 610 where the number of software repositories on a node is determined. In one embodiment, each application residing on the node is associated with one software repository designated to this application. In such an embodiment, the number of software repositories can act as a proxy measurement for the number of resident applications. Similarly, in one embodiment, repository is associated with a resource pool and the number of software repositories can act as a proxy measurement for the number of resource pools on the node, or vice versa.

However, in other embodiments, one application can be hosted by multiple distributed software repositories, so the number of software repositories is not necessarily the same as the number of applications resident on the node. However, in such embodiments, individual application components can be counted as applications, such as the Web server of a composite application.

In one embodiment, the number of software repositories resident on the node can be determined by querying the node itself, or a manager system that manages the node, such as the node operating system, or a node agent that maintains facts about the node. For example, in one embodiment the broker 222 can use the server orchestration system 226 to query the agents 312 as to their current custom fact related to the number of software repositories, as described above with reference to FIG. 3A. In another embodiment, the broker maintains a record in the data store for each node and the number of software repositories on each node, and can retrieve this information without querying the nodes. In such an embodiment, the data store maintained by the broker would be periodically updated by the agent.

At block 620, each repository is weighted based on software type, such as PHP, Ruby, JBoss, ect, as discussed above. Some programming languages have larger memory footprints and/or other resource utilization than others. For example, the weight of PHP applications may be 1 and the weight of a JBoss application may be 1.5 to account for the larger amount of node resources expectedly utilized by the JBoss application. If a node hosts only applications of one software type, or software types with similar resource utilization, then block 620 can be omitted. In other embodiments, block 620 is optional even if applications with different resource utilization footprints reside on the node.

At block 630, each repository is weighted based on application size as discussed above. In one embodiment, nodes are configured to host applications of a certain size. For example, a "large" node would be configured to host a small number (e.g., 10) of large applications, while a "small" node would be configured to host a larger number (e.g., 100) of small applications. If a node hosts only applications of one size, then block 630 can be omitted.

However, in one embodiment, a node is allowed to host applications of different sizes. In such an embodiment for example, the weight of small applications may be 1 and the weight of large applications may be 10 to account for the larger amount of node resources expectedly utilized by the large applications. In other embodiments, block 630 is optional even if applications of different sizes reside on the node.

At block 640, the current node utilization is determined by summing the weighted repositories. In embodiments where blocks 620 and 630 were omitted, at block 640 the actual number of software repositories determined in block 610 is unchanged as the sum is not weighted.

At block 650, the maximum node utilization is determined. The maximum node utilization can be configured by a PaaS administrator. The maximum node utilization can be expressed, in one embodiment, as the maximum number of software repositories that is allowed to reside on the node. In another embodiment, the maximum node utilization can be expressed, as the maximum number of weighted software repositories that is allowed to reside on the node. In one embodiment, the maximum node utilization can be determined by querying the node itself (it can be stored as a custom fact for example), or a manager system that manages the node. In another embodiment, the broker maintains a record in the data store for each node and the maximum node utilization of each node, and can retrieve this information without querying the nodes.

At block 660, the current node capacity is determined by subtracting the current node utilization from the maximum node utilization. Thus, a higher capacity indicates more available and unused node resources. However, in other embodiments other formulas can be used to similar effect. For example, the current node utilization can be divided by the maximum node capacity to express the current node capacity as a percentage.

One illustrative example is as follows. A node currently has 25 resident software repositories. 19 are PHP applications and 6 are JBoss applications. JBoss is weighed as 1.5 PHP applications. Thus, the current utilization is (19*1)+(6*1.5)=28. If the maximum node capacity is 50 software repositories, than the current capacity is 50−28=22. The new application can then be chosen to reside on the node with the most current capacity, as described with reference to FIG. 5.

A similar schema to determine node capacity according to another embodiment is now described with reference to FIG. 7. The processing described with reference to FIG. 7 is, in one embodiment, a more detailed explanation of block 540 of FIG. 5 that can be performed on each discovered node.

Figure 7:
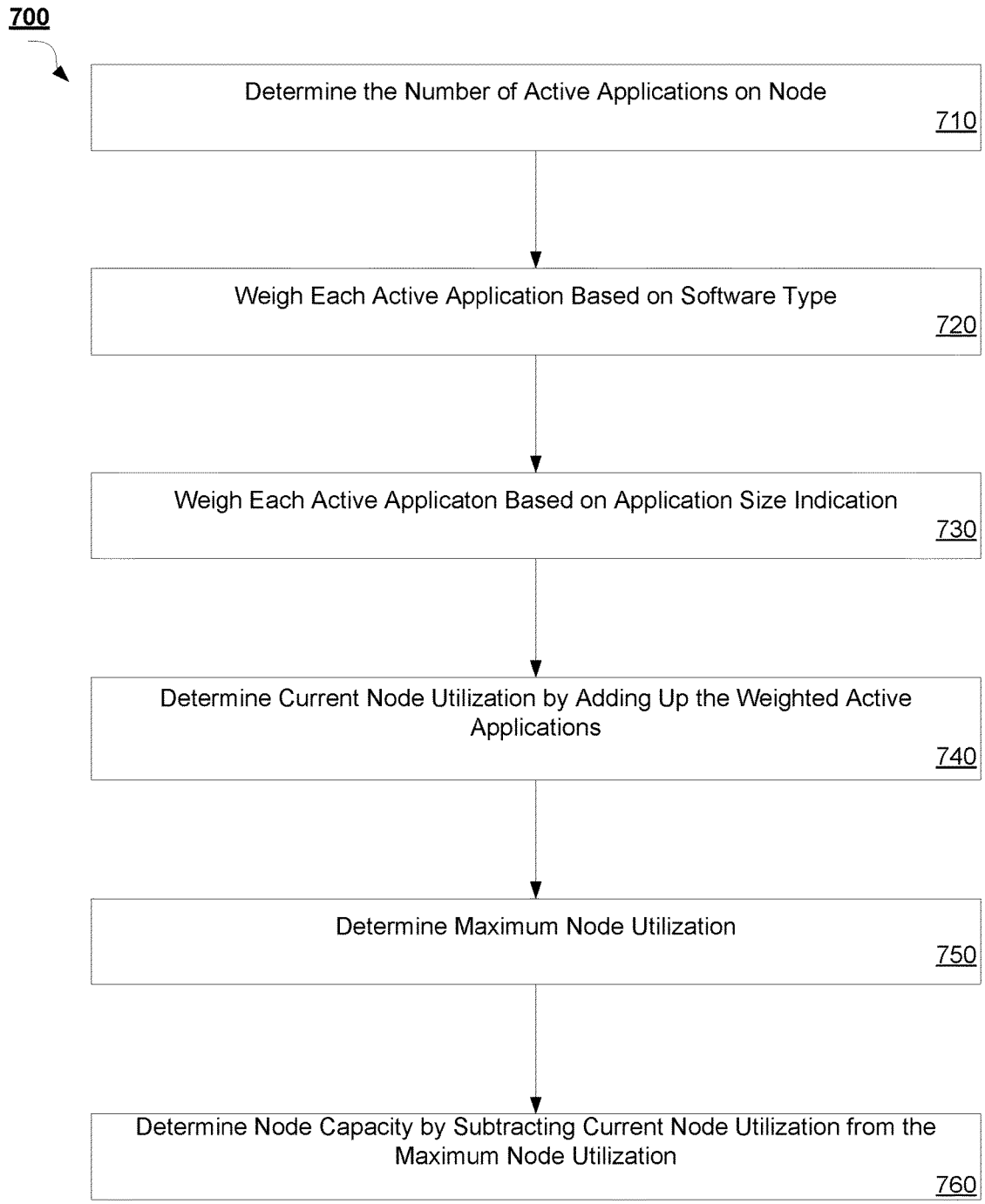
FIG. 7 is a flow diagram illustrating a method for calculating the capacity of a node to host a new application according to another embodiment of the invention.

FIG. 7 is a flow diagram illustrating a method 700 for determining the capacity of a node according to an embodiment of the invention. Method 700 may be performed by processing logic that may comprise hardware (e.g., circuitry, dedicated logic, programmable logic, microcode, etc.), software (such as instructions run on a processing device), firmware, or a combination thereof. In one embodiment, method 400 is performed by the broker 222 of FIG. 2 or the agent of FIG. 3A.

Method 700 begins at block 710 where the number of active applications on the node is determined. As explained above, in one embodiment, some applications may be stopped by their owners or may be idling due to low activity or persistent inactivity. Thus, the number of active application can be determined as the number of applications or application components hosted on the node, minus the applications that are not running (e.g., stopped or never started) and idling. In one embodiment, the number of active applications on the node can be determined by querying the node itself, or a manager system that manages the node. For example, in one embodiment the broker 222 can use the server orchestration system 226 to query the agents 312 as to their current custom fact related to the number of active applications, as described above with reference to FIG. 3. In another embodiment, the broker maintains a record in the data store for each node and the number of active applications from when the node was last queried, and can retrieve this information without querying the nodes.

At block 720, each active application is weighted based on software type, such as PHP, Ruby, JBoss, ect, as discussed above. If a node hosts only applications of one software type, or software types with similar resource utilization, then block 720 can be omitted. In other embodiments, block 720 is optional even if applications with different resource utilization footprints reside on the node.

At block 730, each active application is weighted based on application size as discussed above. If a node hosts only applications of one size, then block 730 can be omitted. However, in one embodiment, a node is allowed to host applications of different sizes. In such an embodiment for example, the weight of small applications may be 1 and the weight of large applications may be 10 to account for the larger amount of node resources expectedly utilized by the large applications. In other embodiments, block 730 is optional even if applications of different sizes reside on the node.

At block 740, the current node utilization is determined by summing the weighted active applications. In embodiments where blocks 720 and 730 were omitted, at block 740 the actual number of active applications determined in block 710 is unchanged as the sum is not weighted.

At block 750, the maximum node utilization is determined. The maximum node utilization can be expressed, in one embodiment, as the maximum number of active applications that is allowed to reside on the node. In another embodiment, the maximum node utilization can be expressed, as the maximum number of weighted active applications that is allowed to reside on the node. In one embodiment, the maximum node utilization can be determined by querying the node itself (it can be stored as a custom fact for example), or a manager system that manages the node. In another embodiment, the broker maintains a record in the data store for each node and the maximum node utilization of each node, and can retrieve this information without querying the nodes.

At block 760, the current node capacity is determined by subtracting the current node utilization from the maximum node utilization. Thus, a higher capacity indicates more available and unused node resources. However, in other embodiments other formulas can be used to similar effect. For example, the current node utilization can be divided by the maximum node capacity to express the current node capacity as a percentage. The new application can then be chosen to reside on the node with the most current capacity, as described with reference to FIG. 5.

Figure 8:
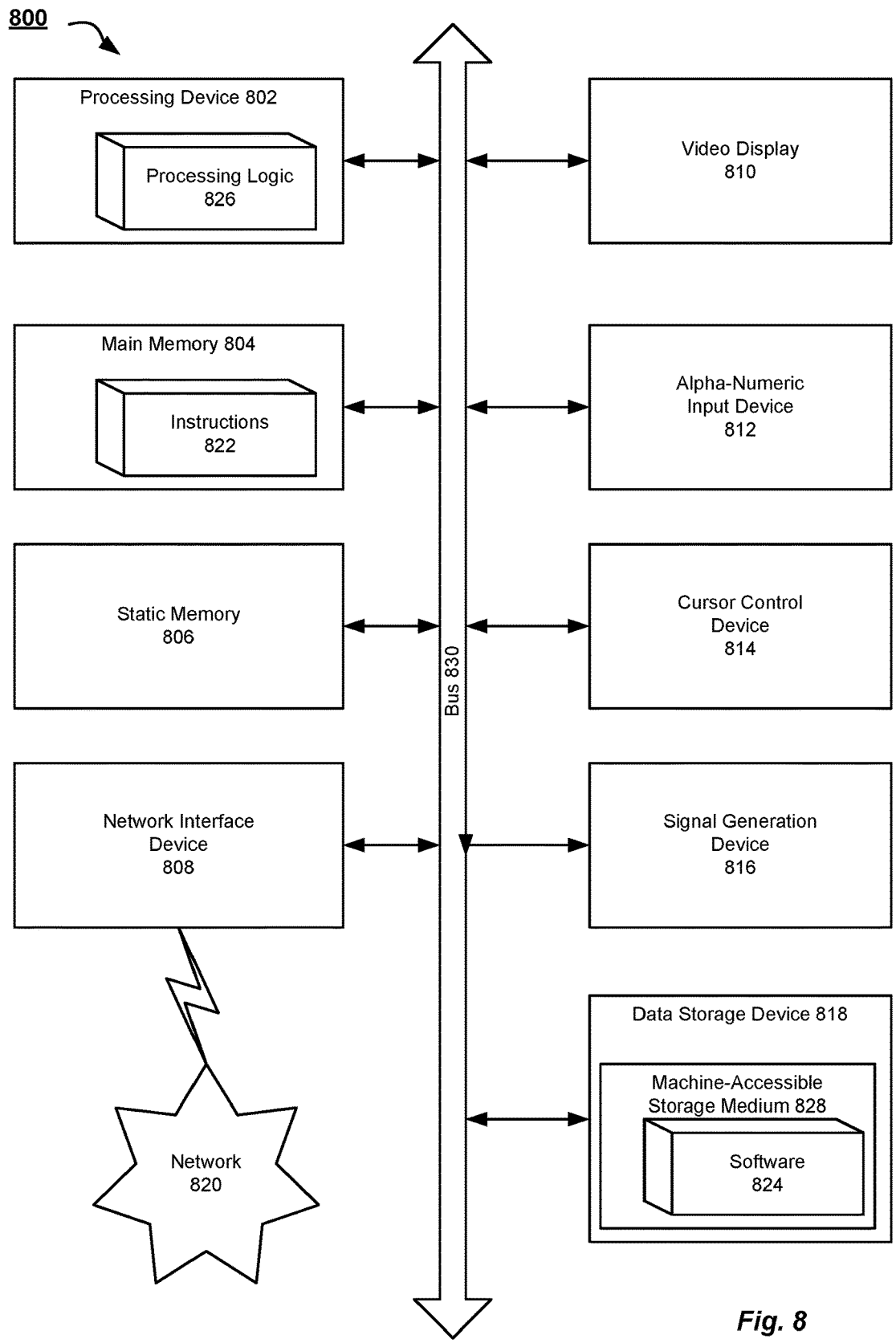
FIG. 8 illustrates a block diagram of one embodiment of a computer system.

FIG. 8 illustrates a diagrammatic representation of a machine in the exemplary form of a computer system 800 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 800 includes a processing device 802, a main memory 804 (e.g., read-only memory (ROM), flash memory, dynamic random access memory (DRAM) (such as synchronous DRAM (SDRAM) or DRAM (RDRAM), etc.), a static memory 806 (e.g., flash memory, static random access memory (SRAM), etc.), and a data storage device 818, which communicate with each other via a bus 830.

Processing device 802 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 is configured to execute the processing logic 826 for performing the operations and steps discussed herein.

The computer system 800 may further include a network interface device 808. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker).

The data storage device 818 may include a machine-accessible storage medium 828 on which is stored software 824 embodying any one or more of the methodologies of functions described herein. The software 824 may also reside, completely or at least partially, within the main memory 804 and/or within the processing device 802 during execution thereof by the computer system 800; the main memory 804 and the processing device 802 also constituting machine-accessible storage media.

The machine-readable storage medium 828 may also be used to store instructions to perform new application launching and capacity calculations, as described for example with reference to FIGS. 5-7 and/or a software library containing methods that call the above applications. While the machine-accessible storage medium 828 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A method, comprising:
instantiating a first web application for a first application owner on a virtual machine; and
instantiating a second web application for a second application owner, wherein the second application owner is different than the first application owner, and instantiating the second web application comprises:
determining that the second web application is associated with an attribute, wherein the first web application is also associated with the attribute, and the attribute comprises an implementation related property of the first web application and the second web application;
identifying the virtual machine as configured to host web applications having the attribute; and
responsive to identifying the virtual machine, instantiating the second web application on the virtual machine hosting the first web application, wherein the second web application is prevented from accessing the first web application and the first web application is prevented from accessing the second web application.

2. The method of claim 1, further comprising:
receiving, from a first client, a first request to instantiate the first web application; and
receiving, from a second client, a second request to instantiate the second web application.

3. The method of claim 1, further comprising:
maintaining a first application identifier for the first web application and a second application identifier for the second web application; and
tracking the virtual machine as hosting the first web application and the second web application in view of the first application identifier and the second application identifier.

4. The method of claim 1, further comprising:
authenticating the first application owner and the second application owner; and
upon successful authentication, collecting information about a plurality of nodes available to host web applications.

5. The method of claim 4, storing the information in a data store, wherein the information comprises key-value pairs to associate node attributes comprising a unique identifier of each node of the plurality of nodes, a name of each node of the plurality of nodes, or a list of applications executing on each node of the plurality of nodes.

6. The method of claim 1, further comprising using a framework to facilitate parallel job execution.

7. The method of claim 1, further comprising:
receiving a revision to the first web application;
identifying the first web application hosted on the virtual machine using a unique identifier of the first web application; and
sending the revision to the first web application hosted on the virtual machine.

8. The method of claim 1, further comprising:
associating the first web application with a first resource pool of the virtual machine; and
associating the second web application with a second resource pool of the virtual machine, wherein the first resource pool is segregated from the second resource pool.

9. The method of claim 1, wherein the virtual machine is a multi-tenant node capable of hosting a plurality of web applications having a plurality of application owners.

10. The method of claim 1, further comprising determining that the virtual machine hosting the first web application has capacity to host the second web application by determining a number of software repositories on the virtual machine, and determining a current node utilization using the number of software repositories.

11. A system, comprising:
a memory device storing instructions; and
a processing device communicatively coupled to the memory device, the processing device to execute the instructions to:
instantiate a first web application for a first application owner on a virtual machine; and
instantiate a second web application for a second application owner, wherein the second application owner is different than the first application owner, and to instantiate the second web application comprises the processing device further to:
determine that the second web application is associated with an attribute, wherein the first web application is also associated with the attribute, and the attribute comprises an implementation related property of the first web application and the second web application;
identify the virtual machine as configured to host web applications having the attribute; and
responsive to identifying the virtual machine, instantiate the second web application on the virtual machine hosting the first web application, wherein the second web application is prevented from accessing the first web application and the first web application is prevented from accessing the second web application.

12. The system of claim 11, wherein the processing device further to:
receive, from a first client, a first request to instantiate the first web application; and
receive, from a second client, a second request to instantiate the second web application.

13. The system of claim 11, wherein the processing device further to:
maintain a first application identifier for the first web application and a second application identifier for the second web application; and
track the virtual machine as hosting the first web application and the second web application in view of the first application identifier and the second application identifier.

14. The system of claim 11, wherein the processing device further to:
receive a revision to the first web application;
identify the first web application hosted on the virtual machine using a unique identifier of the first web application; and
send the revision to the first web application hosted on the virtual machine.

15. The system of claim 11, wherein the processing device further to:
associate the first web application with a first resource pool of the virtual machine; and
associate the second web application with a second resource pool of the virtual machine, wherein the first resource pool is segregated from the second resource pool.

16. The system of claim 11, wherein the virtual machine is a multi-tenant node capable of hosting a plurality of web applications having a plurality of application owners.

17. A non-transitory machine-readable storage medium including instructions that, when executed by a processing device, cause the processing device to:
 instantiate a first web application for a first application owner on a virtual machine; and
 instantiate a second web application for a second application owner, wherein the second application owner is different than the first application owner, and to instantiate the second web application comprises the processing device further to:
  determine that the second web application is associated with an attribute, wherein the first web application is also associated with the attribute, and the attribute comprises an implementation related property of the first web application and the second web application;
  identify the virtual machine as configured to host web applications having the attribute; and
  responsive to identifying the virtual machine, instantiate the second web application on the virtual machine hosting the first web application, wherein the second web application is prevented from accessing the first web application and the first web application is prevented from accessing the second web application.

18. The non-transitory machine-readable storage medium of claim 17, wherein the processing device further to:
 associate the first web application with a first resource pool of the virtual machine; and
 associate the second web application with a second resource pool of the virtual machine, wherein the first resource pool is segregated from the second resource pool.

19. The non-transitory machine-readable storage medium of claim 17, wherein the processing device further to:
 receive a revision to the first web application;
 identify the first web application hosted on the virtual machine using a unique identifier of the first web application; and
 send the revision to the first web application hosted on the virtual machine.

20. The non-transitory machine-readable storage medium of claim 17, wherein the processing device further to determine that the virtual machine hosting the first web application has capacity to host the second web application by determining a number of software repositories on the virtual machine, and determining a current node utilization using the number of software repositories.

* * * * *